United States Patent [19]
Rosen

[11] Patent Number: 5,426,693
[45] Date of Patent: * Jun. 20, 1995

[54] APPARATUS AND METHOD FOR AUTOMATICALLY BLOCKING THE TRANSMISSION OF IDENTIFYING INFORMATION CONCERNING A TELEPHONE CALLING PARTY

[76] Inventor: Howard Rosen, 1 Lyncroft Road, Montreal, Quebec, Canada, H3X 3E3

[*] Notice: The portion of the term of this patent subsequent to May 3, 2011 has been disclaimed.

[21] Appl. No.: 185,512

[22] Filed: Jan. 24, 1994

Related U.S. Application Data

[63] Continuation-in-part of Ser. No. 948,595, Sep. 23, 1992, Pat. No. 5,309,508.

[51] Int. Cl.6 .................. H04M 1/56; H04M 3/42; H04M 5/00; H04M 1/00
[52] U.S. Cl. .................... 379/142; 379/216; 379/245; 379/246; 379/354; 379/355
[58] Field of Search .............. 379/142, 216, 245, 246, 379/354, 355

[56] References Cited

U.S. PATENT DOCUMENTS

| 4,277,651 | 7/1981 | Fisher, II et al. | |
| 4,645,879 | 2/1987 | Simmons . | |
| 4,847,890 | 7/1989 | Solomon et al. | 379/67 |
| 4,873,720 | 10/1989 | Son . | |
| 4,910,767 | 3/1990 | Brugliera et al. | 379/355 |
| 4,926,471 | 5/1990 | Ikeda | 379/354 |
| 5,029,197 | 7/1991 | Hashimoto | 379/355 |
| 5,031,212 | 7/1991 | Saji et al. | 379/355 |
| 5,033,076 | 7/1991 | Jones et al. | 379/88 |
| 5,058,152 | 10/1991 | Solomon et al. | 379/212 |
| 5,134,653 | 7/1992 | Satomi et al. | 379/354 |
| 5,161,181 | 11/1992 | Zwick | 379/142 |
| 5,309,508 | 5/1994 | Rosen | 379/142 |

Primary Examiner—Stephen Chin
Assistant Examiner—Vijay Shankar
Attorney, Agent, or Firm—Oblon, Spivak, McClelland, Maier, & Neustadt

[57] ABSTRACT

An automatic circuit for blocking the transmission of identifying information of a telephone calling party. The automatic circuit has an electronic circuit to detect a telephone off-hook condition. An automatic dialer is also provided and has an input which is connected to the output of the electronic circuit. The automatic dialer is set to dial a predetermined code when the electronic circuit senses the actuation of the detector which detects the off-hook condition. When the predetermined code is received by the computer of the telephone company, it will automatically block the transmission of information which identifies the calling party, and more specifically, the telephone number of the calling party. The off-hook condition detector may be an off-hook switch or a voltage comparator, and other arrangements are foreseeable to detect such off-hook condition.

4 Claims, 2 Drawing Sheets

APPARATUS AND METHOD FOR AUTOMATICALLY BLOCKING THE TRANSMISSION OF IDENTIFYING INFORMATION CONCERNING A TELEPHONE CALLING PARTY

CROSS-REFERENCE TO RELATED APPLICATION

This application is a C-I-P of application Ser. No. 948,595, filed Sep. 23, 1992, now U.S. Pat. No. 5,309,508.

BACKGROUND OF INVENTION

1. Field of the Invention

The invention relates to an automatic circuit for blocking the transmission of identifying information of a calling party on a telephone network.

2. Description of Prior Art

Telephone companies presently provide Caller ID service whereby to identify, to a party receiving a telephone call, the telephone number of the calling party. With this service, the telephone number of the calling party is transmitted, along with the ringing signal and, if the receiving party has a special receiving device for this purpose, the number of the calling party will be displayed on this special device.

There are times when it is inconvenient to a calling party to have his phone number disclosed to the receiving party. For example, the calling party may be calling from an unlisted telephone number which he does not wish to disclose to the receiving party. For this reason, the telephone companies providing the above services have received complaints and they therefore now provide a further service whereby, on action of the calling party, the transmission of the identifying information will be blocked.

This action, which can be taken by any telephone subscriber, consists of first registering with the telephone company. Thereafter, before dialing any telephone number, the caller would dial a predetermined code, for example, *67.

The predetermined code is transmitted to a computer of the telephone company which then blocks the transmission of the identifying information.

One of the problems with this solution is that it is inconvenient to continually dial the predetermined code before dialing any telephone number. In addition, it is possible that a calling party will forget to dial the predetermined code whereupon his telephone number will be transmitted.

SUMMARY OF INVENTION

It is therefore an object of the invention to provide a device which eliminates the necessity for the calling party to dial the predetermined code.

It is also an object of the invention to provide a method which eliminates the necessity for the calling party to dial the predetermined code.

It is a more specific object of the invention to provide an apparatus which automatically dials the predetermined code before the calling party dials the telephone number of the receiving party.

It is a further object of the invention to provide a telephone so modified as to perform the functions of the above-described device.

It is a further object of the invention to provide a method wherein the predetermined code is automatically dialed before the calling party dials the telephone number of the receiving party.

In accordance with the broad principles of the invention, the apparatus includes a means for detecting an off-hook condition and, upon detection of the off-hook condition, initiates an automatic dialer which automatically dials the predetermined code.

Also, in accordance with the broad principles of the invention, an off-hook detector detects an off-hook condition and, upon detection of the off-hook condition, initiates an automatic dialer to automatically dial the predetermined code before the calling party dials the telephone number of the receiving party. When the predetermined code is received by the computer of the telephone company, it will automatically block the transmission of information which identifies the calling party, and more specifically, the telephone number of the calling party. In accordance with a still further broad aspect of the present invention there is provided an automatic circuit for blocking the transmission of identifying information of a telephone calling party. The automatic circuit comprises means for detecting a telephone off-hook condition. Electronic circuit means is also provided and has an input connected to the means for detecting the off-hook condition. An automatic dialer is further provided and has an input connected to the output of the electronic circuit means. The automatic dialer initiates the dialing of a predetermined code when the electronic circuit means senses the actuation of the means for detecting an off-hook condition. The predetermined code, when received by computers of a telephone company, will automatically block the transmission of information which identifies the calling party, and more specifically, the telephone number of the calling party.

According to a still further broad aspect of the present invention there is provided an automatic circuit for blocking the transmission of identifying information of a telephone calling party. The automatic circuit comprises means for detecting a telephone off-hook condition. A microprocessor is also provided and has an input connected to the means for detecting the off-hook condition. The microprocessor is programmed to automatically dial a predetermined code after sensing the actuation of the means for detecting the off-hook condition. The predetermined code, when received by computers of a telephone company, will automatically block the transmission of information which identifies the calling party, and more specifically, the telephone number of the calling party.

electronic circuit means having an input connected to said off-hook switch;

an automatic dialer having an input connected to the output of said electronic circuit means;

said automatic dialer being set to dial a predetermined code;

so that, when the electronic circuit means senses the actuation of the off-hook switch, it initiates the dialing of the predetermined code by the automatic dialer. When the predetermined code is received by the computer of the telephone company, it will automatically block the transmission of information which identifies the calling party, and more specifically, the telephone number of the calling party.

In accordance with a further particular embodiment of the invention there is provided improvements in a telephone including an off-hook switch, said improvements comprising;

said off-hook switch. When the predetermined code is received by the computer of the telephone company, it will automatically block the transmission of information which identifies the calling party, and more specifically, the telephone number of the calling party.

BRIEF DESCRIPTION OF DRAWINGS

The invention will be better understood by an examination of the following description, together with the accompanying drawings, in which.

DESCRIPTION OF PREFERRED EMBODIMENTS

Figure 1:
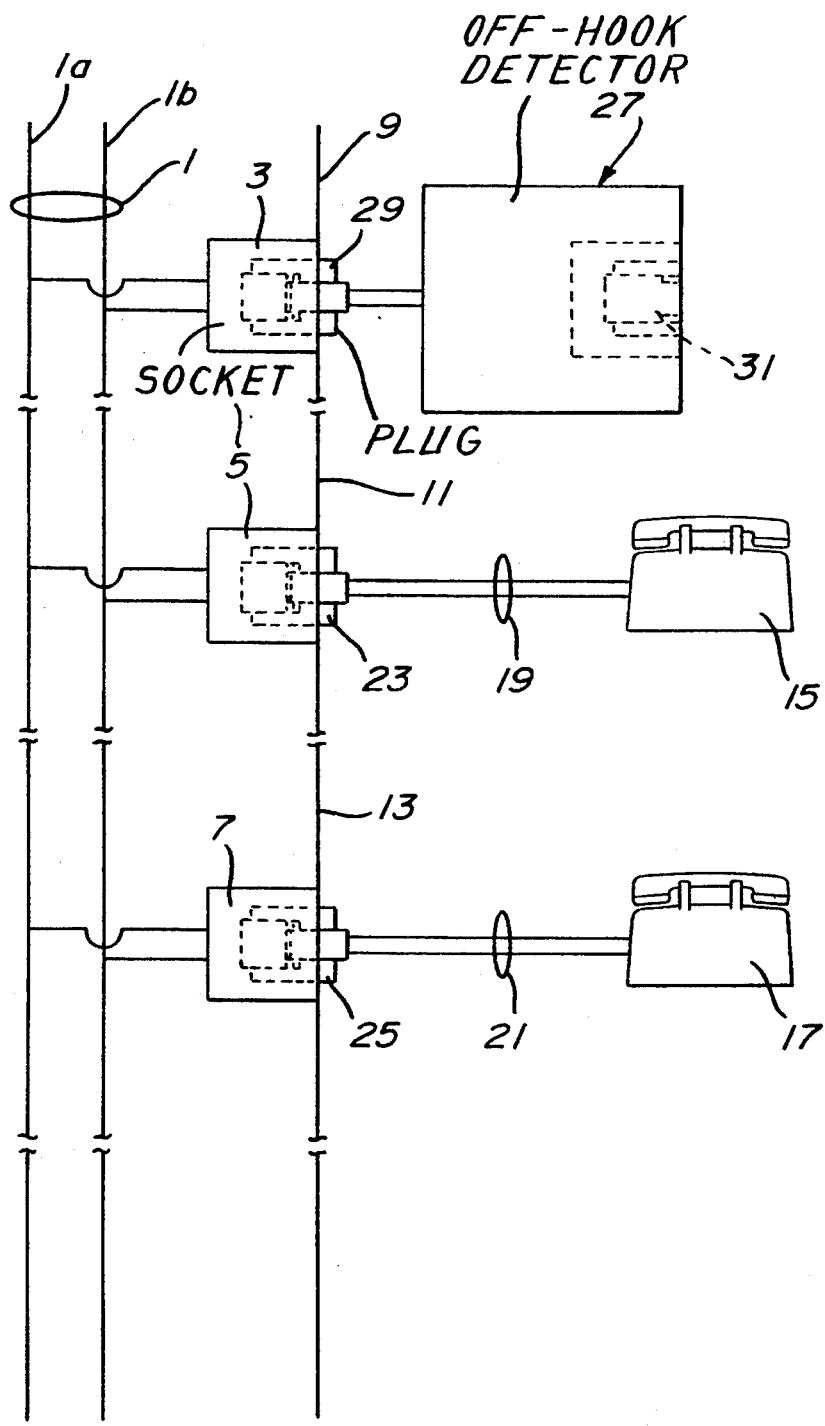
FIG. 1 illustrates a telephone arrangement in which the inventive apparatus is connected.

Referring to FIG. 1, a telephone line 1, consisting of wires 1a and 1b, is connected to a plurality of sockets 3, 5 and 7, mounted on walls 9, 11 and 13 respectively in a household. Telephones 15 and 17 are connected, via lines 19 and 21 respectively, to plugs 23 and 25 respectively which are plugged into sockets 5 and 7 respectively whereupon the telephones 15 and 17 are connected to the telephone line 1. Although FIG. 1 illustrates a situation in which a single line services a plurality of telephones, the invention is equally applicable when the telephone line services only a single telephone as will be discussed below.

The apparatus in accordance with the invention is illustrated generally at 27 in FIG. 1 and includes a plug 29, which mates with the socket 3, as well as a socket 31 which is similar to the socket 3.

Figure 2:
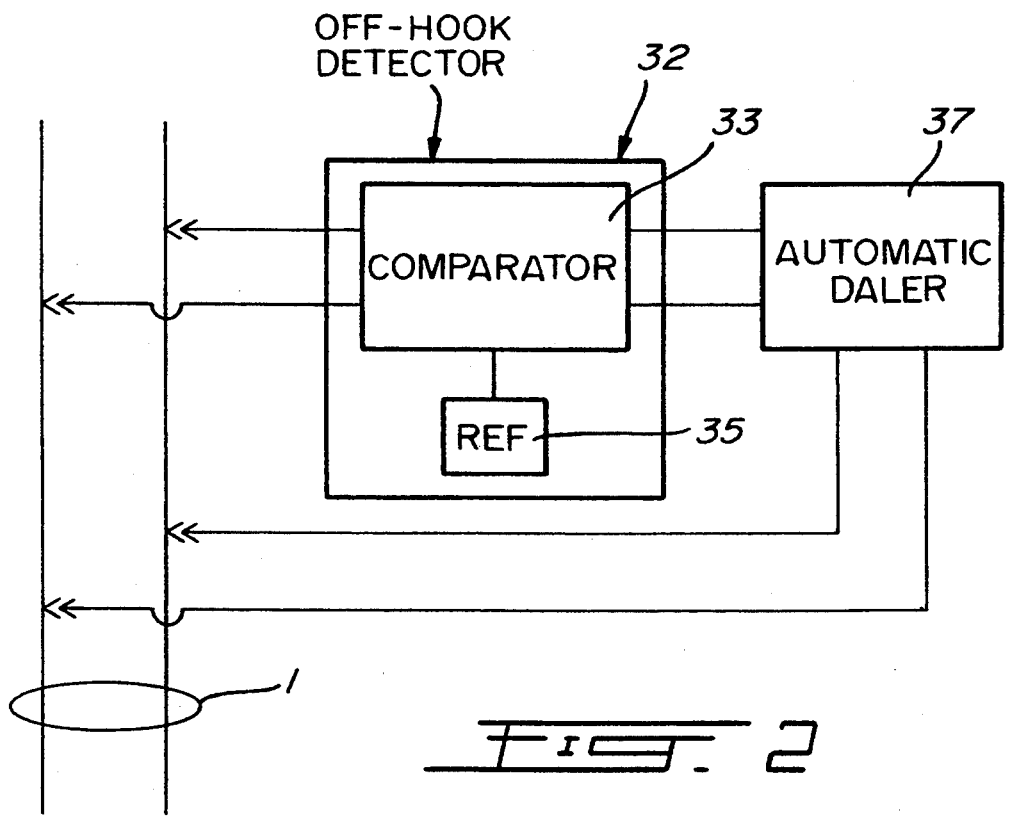
FIG. 2 is a schematic blocked diagram of the inventive apparatus.

In FIG. 2, the apparatus comprises an off-hook detector 32 which, in one embodiment, can comprise a voltage comparator 33 having an input terminal and a reference input which is fed with a reference voltage 35. As is known, when the line changes from an on-hook to an off-hook condition, there is a change in voltage—usually a decrease in voltage, across the line. This change is detected by comparator 33 which compares the voltage on the line with a reference voltage. Other arrangements could be used to detect the off-hook condition as well known in the art.

The output of the off-hook detector 32 is fed to an automatic dialer. When an off-hook condition is detected by the off-hook detector, an initiating signal is transmitted to the automatic dialer whereupon the automatic dialer will dial the predetermined code to block the transmission of the identifying information of the calling party. This predetermined code is applied to the telephone line 1.

The automatic dialer dials at a high enough speed so that the action of the apparatus 27 (FIG. 1) is essentially transparent to the calling party. Accordingly, the predetermined code is automatically dialed each time the receiver of the telephone is lifted to place the telephone line in an off-hook condition. Thus, the calling party does not have to go through the inconvenience of dialing the predetermined code each time, nor is it possible for the calling party to dial the number and forget to predial the predetermined code.

Returning to FIG. 1, when the telephone line is servicing only a single telephone, then that telephone would be plugged into socket 31 of the apparatus 27. In fact, this would be possible even when the line 1 is servicing a plurality of telephone lines. This eliminates the possibility that a socket will have to be used solely for the apparatus 27. That is, in accordance with the invention, both the inventive apparatus 27 and a telephone can be plugged into the same socket 3.

In the illustrated embodiment, the apparatus 27 has been described as a separate unit. It is also within the scope of the invention to incorporate the elements of device 27 in the telephone instrument (15 or 17) so that it forms a part of the instrument.

The inventive apparatus could, of course, be used to block other information of the calling party than the telephone number of the calling party.

Figure 3:
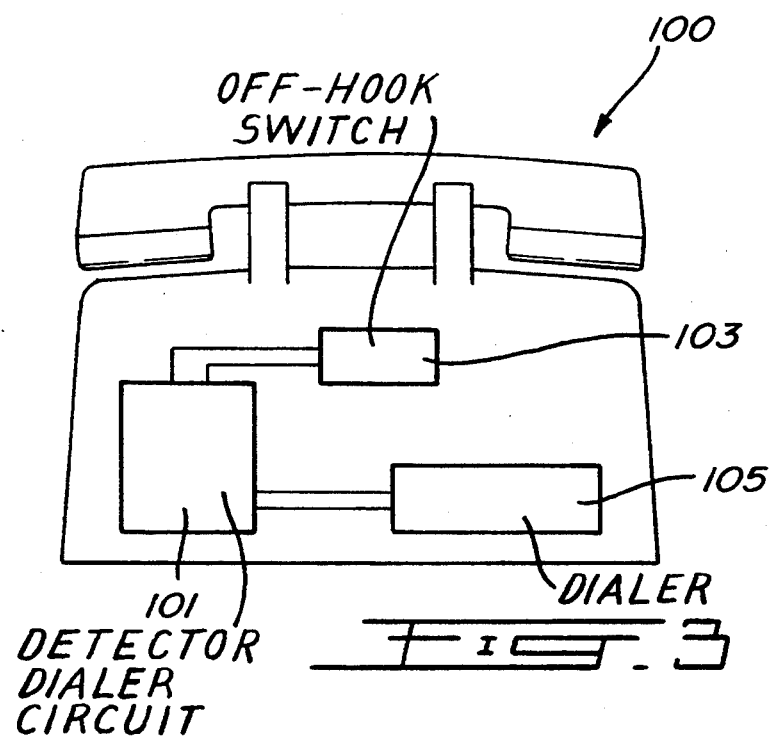
FIG. 3 illustrates schematically a telephone modified to block the transmission of identifying information of that particular telephone.

Referring now to FIG. 3, a telephone, illustrated generally at 100, includes electronic circuitry 101 having one input connected to off-hook switch 103. An output of the circuitry 101 is connected to dialer arrangement 105.

When the receiver is lifted off the hook, the off-hook switch 103 is activated and the off-hook switch activation is detected by the circuitry 101. Upon detection of the off-hook condition, a signal is sent to the dialer 105 to dial a predetermined code.

Although the FIG. 3 embodiment as described herein is directed to a telephone having an off-hook switch 103, and although the step of detecting the off-hook condition in the FIG. 3 embodiment is described as monitoring the off-hook switch 103 until its activation is detected, it will of course be apparent that the off-hook condition can be detected in other ways, for example, see above in the present application. In addition, there are many other methods well known in the art for detecting the off-hook condition, and any one of these could be used in implementing the invention of the FIG. 3 embodiment.

As will be obvious, the circuitry 101 can comprise a microprocessor which would also include the dialer 105. The microprocessor 101 would then dial the predetermined code, for example, *67, in execution of software instructions.

Although a particular embodiment has been described, this was for the purpose of illustrating, but not limiting, the invention. Various modifications, which will come readily to the mind of one skilled in the art, are within the scope of the invention as defined in the appended claims.

I claim:

1. An automatic circuit for blocking the transmission of identifying information of a telephone calling party, said automatic system comprising means for detecting a telephone off-hook condition;

electronic circuit means having an input connected to said means for detecting said off-hook condition;

an automatic dialer having an input connected to the output of said electronic circuit means;

said automatic dialer initiating the dialing of a predetermined code when said electronic circuit means senses the actuation of said means for detecting an off-hook condition, said predetermined code, when received by computers of a telephone company, will automatically block the transmission of information which identifies the calling party, and more specifically, the telephone number of said calling party.

2. An automatic circuit for blocking the transmission of identifying information of a telephone calling party, said automatic system comprising means for detecting a telephone off-hook condition;

a microprocessor having an input connected to said means for detecting said off-hook condition;

said microprocessor being programmed to automatically dial a predetermined code after sensing the actuation of the means for detecting said off-hook condition, said predetermined code, when received by computers of a telephone company, will automatically block the transmission of information which identifies the calling party, and more specifically, the telephone number of said calling party.

3. An automatic circuit as defined in claim 1 wherein said means for detecting said off-hook condition is an off-hook switch.

4. An automatic circuit as defined in claim 2 wherein said means for detecting said off-hook condition is an off-hook switch.

* * * * *